(12) United States Patent
Seine et al.

(10) Patent No.: US 12,540,012 B2
(45) Date of Patent: Feb. 3, 2026

(54) PIPING BAG FOR DISPENSING A VISCOUS MASS OF FOODSTUFF

(71) Applicant: Inventor Factory B.V., Heino (NL)

(72) Inventors: Timo Seine, Wijhe (NL); Egbert Willem Stegeman, Heino (NL)

(73) Assignee: Timo Seine B.V., Wijhe (NL)

( * ) Notice: Subject to any disclaimer, the term of this patent is extended or adjusted under 35 U.S.C. 154(b) by 172 days.

(21) Appl. No.: 18/288,430

(22) PCT Filed: May 4, 2021

(86) PCT No.: PCT/NL2021/050290
§ 371 (c)(1),
(2) Date: Oct. 26, 2023

(87) PCT Pub. No.: WO2022/235150
PCT Pub. Date: Nov. 10, 2022

(65) Prior Publication Data
US 2024/0208696 A1    Jun. 27, 2024

(51) Int. Cl.
*B65D 35/28* (2006.01)
*A21C 15/00* (2006.01)
*B65D 35/44* (2006.01)

(52) U.S. Cl.
CPC ............ *B65D 35/44* (2013.01); *A21C 15/005* (2013.01); *B65D 35/28* (2013.01)

(58) Field of Classification Search
CPC ........ B65D 35/44; B65D 35/28; A21C 15/005
See application file for complete search history.

(56) References Cited

U.S. PATENT DOCUMENTS

| 10,492,500 | B1 * | 12/2019 | Siwak | B65D 1/32 |
| 10,597,210 | B2 | 3/2020 | Franca et al. | |
| 10,869,486 | B2 * | 12/2020 | Siwak | B65D 83/771 |
| 12,004,517 | B2 * | 6/2024 | Lindsey | A23G 3/28 |

(Continued)

FOREIGN PATENT DOCUMENTS

| EP | 1813546 B2 | 5/2013 |
| EP | 3280263 A2 | 2/2018 |
| ES | 1003792 U | 8/1988 |

OTHER PUBLICATIONS

International Search Report and Written Opinion—PCT/NL2021/050290—mailing date Nov. 10, 2022.

*Primary Examiner* — Frederick C Nicolas
(74) *Attorney, Agent, or Firm* — Banner & Witcoff, Ltd.

(57) ABSTRACT

A piping bag (1) for dispensing a viscous mass of foodstuff includes a dispensing opening structure (7) having first and second plates (11, 12), which are elastically deformable, and which are fixed relative to one another along their longitudinal opposite side edges (21A, 21B, 22A, 22B). The dispensing opening structure has a closed condition in which the first and second plates are each in an elastically relaxed condition, and an open condition in which the first and second plates, under influence of a user pressurizing the viscous mass within the piping bag, are each in an elastically tensioned condition by being elastically deformed. The invention provides a highly efficient and highly hygienic solution according to which a user can interrupt and resume the dispensing use of the piping bag. At the same time the solution provided by the invention allows for favourable dispensing results.

4 Claims, 5 Drawing Sheets

(56) References Cited

U.S. PATENT DOCUMENTS

| | | | | |
|---|---|---|---|---|
| 12,127,563 B2* | 10/2024 | Siwak | ................... | B65D 83/771 |
| 2008/0041878 A1* | 2/2008 | Day | ..................... | A21C 15/005 |
| | | | | 222/107 |
| 2019/0373911 A1* | 12/2019 | Brown | ................. | B65D 77/062 |

* cited by examiner

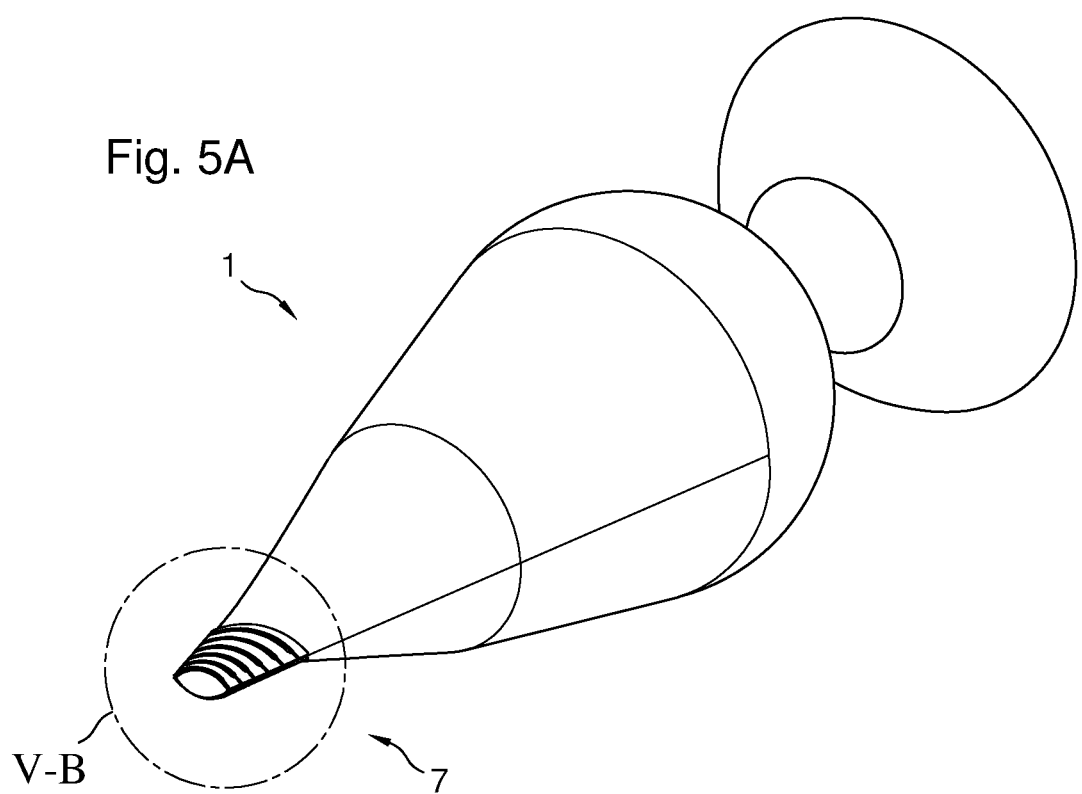
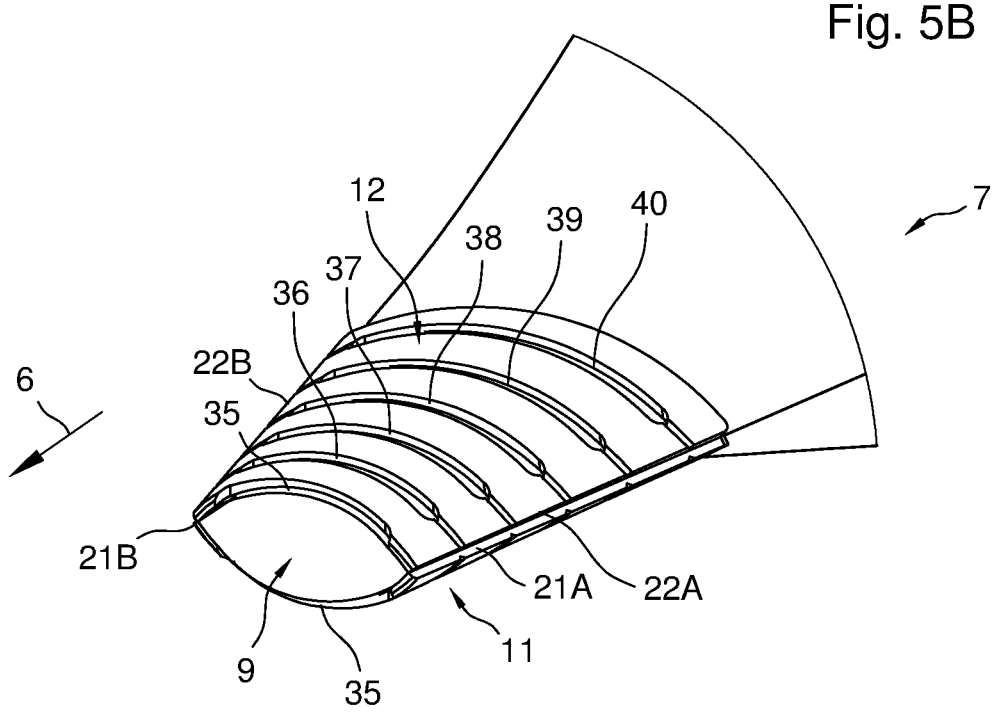

PIPING BAG FOR DISPENSING A VISCOUS MASS OF FOODSTUFF

CROSS-REFERENCE TO RELATED APPLICATIONS

This application is a U.S. National Stage application under 35 U.S.C. § 371 of International Application PCT/NL2021/050290 (published as WO 2022/235150 A1), filed May 4, 2021. Benefit of the filing date of this prior application is hereby claimed. This prior application is hereby incorporated by reference in its entirety.

FIELD OF THE INVENTION

The invention relates to a piping bag for dispensing a viscous mass of foodstuff, wherein:
- the piping bag comprises a flexible circumferential boundary wall of a film material,
- the circumferential boundary wall is extending circumferentially around a longitudinal direction of the piping bag,
- the piping bag comprises a filling end and a dispensing end, which are lying mutually opposite in said longitudinal direction,
- a dispensing direction of said piping bag is defined as extending along said longitudinal direction from said filling end towards said dispensing end,
- the piping bag along at least a part of the longitudinal direction is narrowing in said dispensing direction.

SUMMARY OF THE INVENTION

It is a main object of the invention to provide a highly efficient and highly hygienic solution according to which a user, after having dispensed part of such a viscous mass from such a piping bag, can break off the use of the piping bag, lay the piping bag apart for shorter or longer periods of time, and then resume the use of the piping bag for dispensing remaining parts of the viscous mass therefrom. At the same time the solution, as provided by the invention, should allow for favourable dispensing results in terms of the shapes of various types of dispensed viscous masses of foodstuff.

For that purpose the invention provides a piping bag of the type as initially identified above, and further characterized in that:
- the circumferential boundary wall comprises a dispensing opening structure, which is elastically deformable, and which comprises a first plate and a second plate, wherein:
  - each of the first plate and the second plate:
    - is elastically deformable,
    - is located at a dispensing end portion of the piping bag, wherein said dispensing end portion includes said dispensing end of the piping bag,
    - is fixed relative to said film material of said flexible circumferential boundary wall,
  - the first plate has a first pair of first longitudinal opposite side edges, which in said dispensing direction are mutually converging, whereby the first plate is narrowing in said dispensing direction,
  - the second plate has a second pair of second longitudinal opposite side edges, which in said dispensing direction are mutually converging, whereby the second plate is narrowing in said dispensing direction,
  - the respective first longitudinal opposite side edges of the first plate are parallel to the respective second longitudinal opposite side edges of the second plate,
  - the first plate and the second plate are fixed relative to one another along the first longitudinal opposite side edges and the second longitudinal opposite side edges, wherein the respective first longitudinal opposite side edges of the first plate are fixed relative to the respective second longitudinal opposite side edges of the second plate, in such manner that the dispensing opening structure has:
    - a closed condition in which the first plate and the second plate are each in an elastically relaxed condition in which the first plate and the second plate are straightly planar and are extending alongside one another in a mutually parallel manner, whereby the first plate and the second plate are creating a closure of said dispensing end portion of the piping bag, wherein said closure prevents a viscous mass of foodstuff inside the piping bag to be dispensed from the piping bag in that said viscous mass can not pass between the first plate and the second plate, and
    - an open condition in which, under influence of a user pressurizing said viscous mass within the piping bag, the first plate and the second plate are each in an elastically tensioned condition by being elastically deformed, relative to said elastically relaxed condition, in a circumferentially curved manner around the longitudinal direction of the piping bag, whereby in-between the first plate and the second plate a dispensing passage is automatically created so that said viscous mass may be expelled, via said dispensing passage, from the piping bag.

Hence, the piping bag according to the invention comprises the above-recited specific dispensing opening structure, having the above-recited closed condition and open condition.

Thanks to its above-recited features, the dispensing opening structure of a filled piping bag automatically transfers from its closed condition into its open condition, when a user starts to pressurize the viscous mass within the piping bag, which is an action that the user needs to perform anyway when the user wishes to dispense viscous mass from the piping bag. Accordingly, this is highly efficient. Conversely, thanks to its elasticity, the dispensing opening structure of the piping bag automatically returns from its open condition into its closed condition, when a user stops pressurizing the viscous mass within the piping bag, which—again—is an action that the user needs to perform anyway when the user wishes to break off the dispensing action. So also this is highly efficient.

Furthermore the invention provides a highly hygienic solution, since the user does not necessarily need to touch the dispensing end for starting and ending dispensing actions. And, when the user terminates a dispensing action, the dispensing opening structure closes not only automatically, but also immediately. This means that, at the dispensing end of the piping bag, there is an immediate termination of contamination risk from the outside to the inside of the piping bag, as well as an immediate termination of leakage of viscous mass from the dispensing end.

At the same time it has surprisingly turned out that the solution of the present invention allows for surprisingly favourable dispensing results in terms of the shapes of various types of dispensed viscous masses of foodstuff. Without wishing to be bound by any theory, it is believed that these favourable dispensing results are to be attributed to the very specific configuration of the first and second plates of the dispensing opening structure, especially the way in which the first and second plates are fixed relative to one another along their respective first and second opposite side edges, as well as how they are fixed relative to the film material, in combination with the elastic deformabilities of the first and second plates. It is believed that in this very specific configuration of the first and second plates the natural deformation character provided by physical elasticity laws result into shapes of the dispensing orifice of the dispensing passage which provide practical and visually appealing natural shapes of various types of dispensed viscous masses of foodstuff. And, yet even better, it has surprisingly turned out that said natural shapes of the dispensing orifice of the dispensing passage are controllable to be variable by the amount of pressure exerted by the user when pressurizing the viscous mass within the piping bag, so that the chef can exercise his or her skills at will in order to produce practical and visually appealing food creations.

In a preferable embodiment of a piping bag according to the invention, at least the film material of the flexible circumferential boundary wall closes off the dispensing end of the piping bag to prevent viscous mass of foodstuff inside the piping bag to be dispensed from the piping bag, even in case of said open condition of the dispensing opening structure, and wherein a user can cut or snip through the film material, the first plate and the second plate in a cutting or snipping direction transverse to the longitudinal direction of the piping bag to cut off or snip off a part of the dispensing end portion of the piping bag, so as to undo that at least the film material of the flexible circumferential boundary wall closes off the dispensing end of the bag, and so as to allow said viscous mass of foodstuff inside the piping bag to be dispensed from the piping bag in said open condition of the dispensing opening structure.

As an alternative to the above-mentioned preferable embodiment, a piping bag according to the invention may not have the feature that the film material of the flexible circumferential boundary wall closes off the dispensing end of the bag. In such an alternative, the user can start dispensing without having to cut off or snip off a part of the dispensing end portion of the piping bag.

In another preferable embodiment of a piping bag according to the invention, the first plate and/or the second plate are comprising at least one prefabricated weakening, which is extending in a cutting or snipping direction transverse to the longitudinal direction of the piping bag so as to make it easier for a user to cut off or snip off at said prefabricated weakening a longitudinal section, in said longitudinal direction, of the dispensing opening structure. Such at least one prefabricated weakening can for example be at least one slot and/or at least one notch.

Preferably, said at least one prefabricated weakening comprises a first prefabricated weakening and a second prefabricated weakening, wherein the first prefabricated weakening is located farther in said dispensing direction than the second prefabricated weakening. This allows a user to create a relatively small dispensing orifice at said first prefabricated weakening, by cutting off or snipping off a longitudinal section of the dispensing opening structure at said first prefabricated weakening, or to create a relatively large dispensing orifice at said second prefabricated weakening by cutting off or snipping off a longitudinal section of the dispensing opening structure at said second prefabricated weakening.

BRIEF DESCRIPTION OF THE DRAWINGS

In the following, the invention is further elucidated with reference to non-limiting embodiments and with reference to the schematic figures in the appended drawing, in which the following is shown.

In FIG. 3A the dispensing opening structure is in a CLOSED condition.

FIG. 5A shows, in a perspective view, the piping bag of FIG. 4A, however, wherein this time a longitudinal section of the dispensing opening structure of the piping bag has been SNIPPED OFF by a user at SECOND prefabricated weakenings of the first and second plates of the dispensing opening structure, respectively. In FIG. 5A, the dispensing opening structure is in an OPEN condition.

FIG. 5B shows an enlarged view of detail V-B, as indicated in FIG. 5A.

DETAILED DESCRIPTION

Figure 1A:
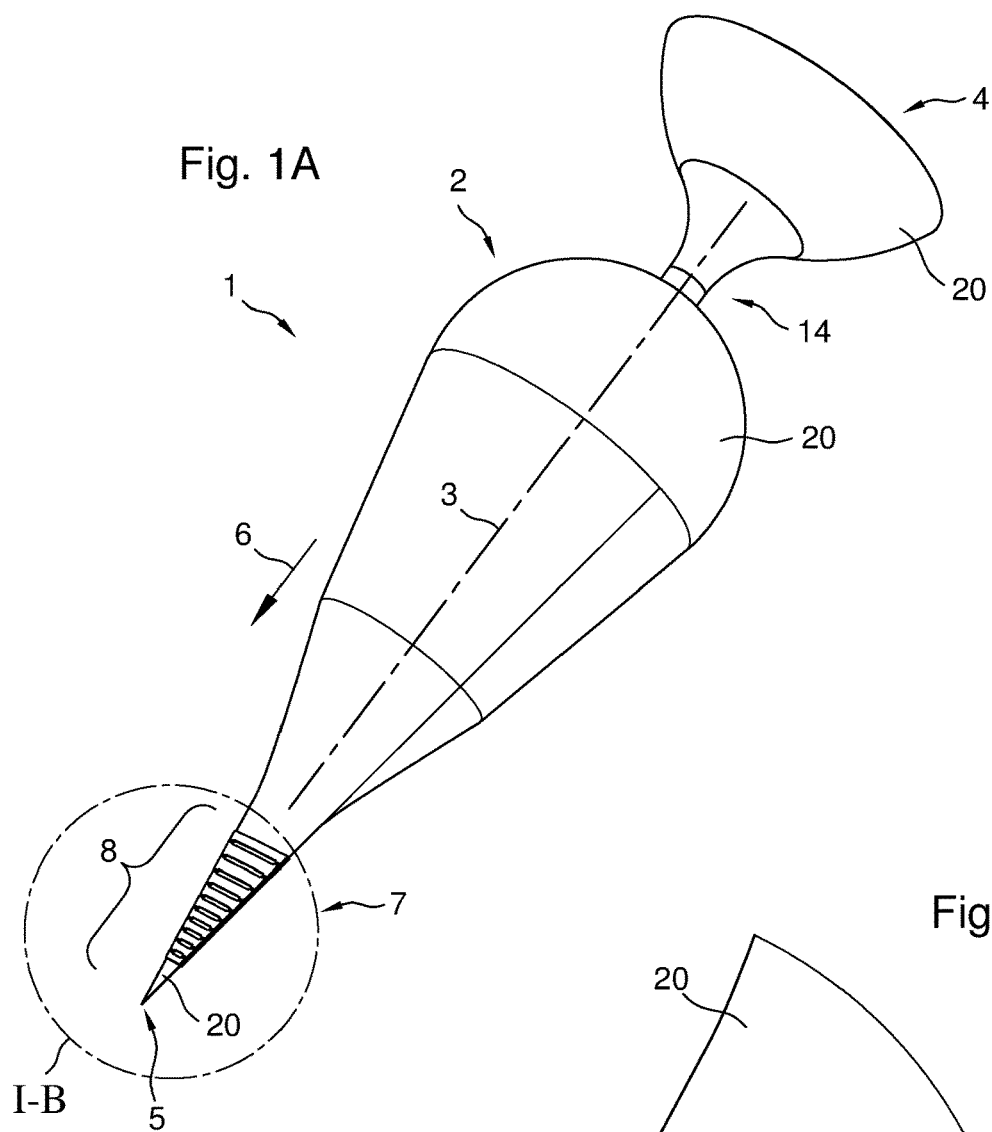
FIG. 1A shows, in a perspective view, an example of an embodiment of a PIPING BAG according to the invention, wherein the piping bag is FILLED with a viscous mass of foodstuff.

The reference signs used in FIGS. 1-5 are referring to the above-mentioned parts and aspects of the invention, as well as to related parts and aspects, in the following manner.

1 piping bag
2 circumferential boundary wall
3 longitudinal direction
4 filling end
5 dispensing end
6 dispensing direction
7 dispensing opening structure
8 dispensing end portion
9 dispensing passage
10 snipping direction
11 first plate
12 second plate
14 grasped section
20 film material
21A, 21B first longitudinal opposite side edges
22A, 22B second longitudinal opposite side edges
31-40 prefabricated weakenings Based on the above introductory description, including the brief description of the drawing figures, and based on the above-listed reference signs used in FIGS. 1-5, the examples of FIGS. 1-5 are readily self-explanatory. The following extra explanations are given.

The piping bag 1 of FIGS. 1-5 is a piping bag according to the invention, as well as according to all of the above-mentioned preferable embodiments of the invention.

As mentioned, the piping bag 1 is shown when filled with a viscous mass of foodstuff. In FIG. 1A the reference numeral 14 indicates a section of the piping bag 1, which is grasped by one or both hands of a user of the piping bag. For simplicity the hand(s) of the user are not shown in FIG. 1A. In the situation of FIGS. 1-3, the dispensing opening structure 7 is in closed condition.

In the shown example the first plate 11 and the second plate 12 are each fixedly attached to the outer side of the film material 20 of the circumferential boundary wall 2 of the piping bag 1.

Furthermore, the first plate 11 and the second plate 12 are each provided with ten prefabricated weakenings 31-40, each of which is extending in a cutting or snipping direction transverse to the longitudinal direction of the piping bag 1. See FIG. 3B, in which the prefabricated weakenings 31-40 of the second plate 12 can be seen. It is noted that the first plate 11 has ten similar prefabricated weakenings 31-40, which are mirrored relative to those of the second plate 12. Of these mirrored prefabricated weakenings 31-40 of the first plate 11, only a first prefabricated weakening 31 is visible in FIGS. 3B and 4B, while only a second prefabricated weakening 35 is visible in FIG. 5B. In the shown example all prefabricated weakenings 31-40 of the first plate 11 and the second plate 12 are blind slots, which are extending along the snipping direction 10 (indicated in FIG. 1B) in-between the first longitudinal opposite side edges 21A and 21B, and in-between the second longitudinal opposite side edges 22A and 22B, respectively. Alternatively, many various other types of prefabricated weakenings are of course possible.

Figure 3A:
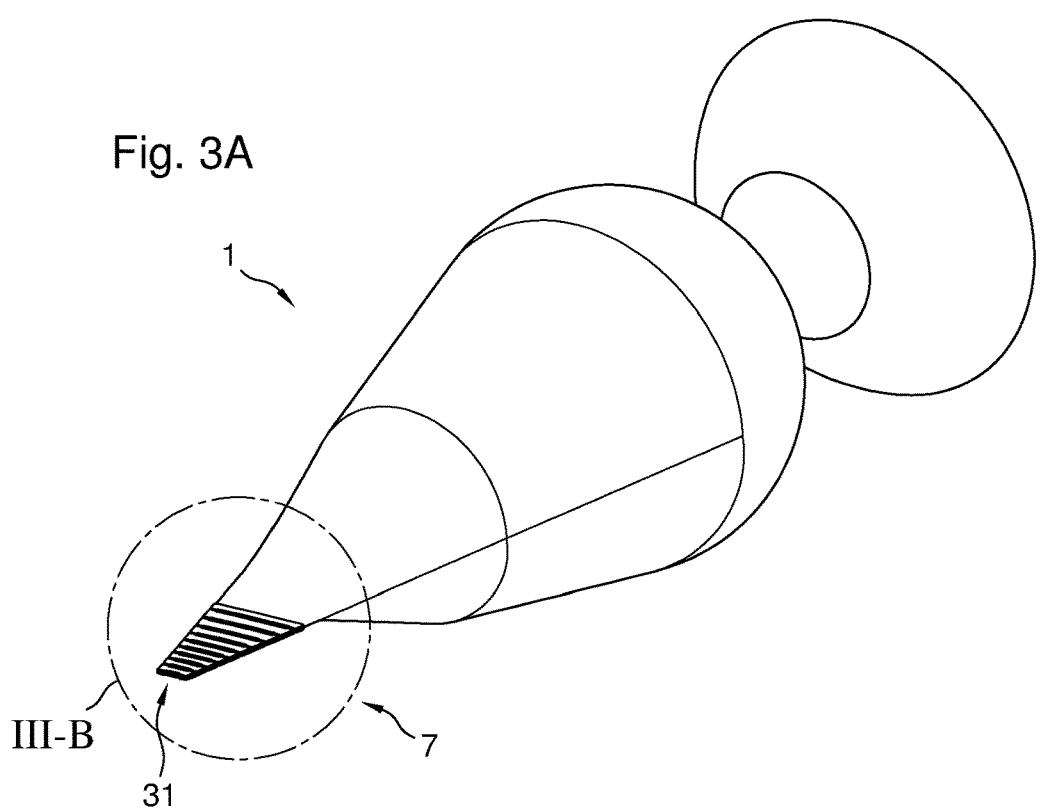
FIG. 3A shows, in a perspective view, the piping bag of FIG. 1A, however, wherein this time a longitudinal section of the dispensing opening structure of the piping bag has been SNIPPED OFF by a user at FIRST prefabricated weakenings of the first and second plates of the dispensing opening structure, respectively.
Figure 3B:
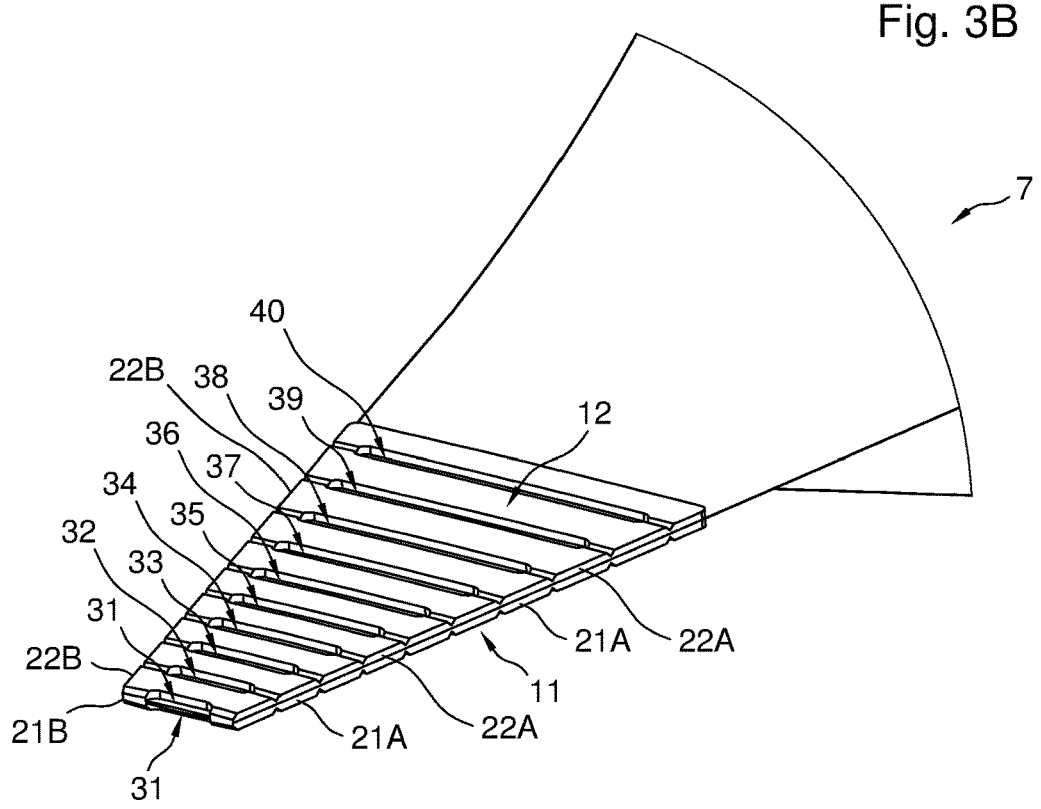
FIG. 3B shows an enlarged view of detail III-B, as indicated in FIG. 3A.
Figure 4A:
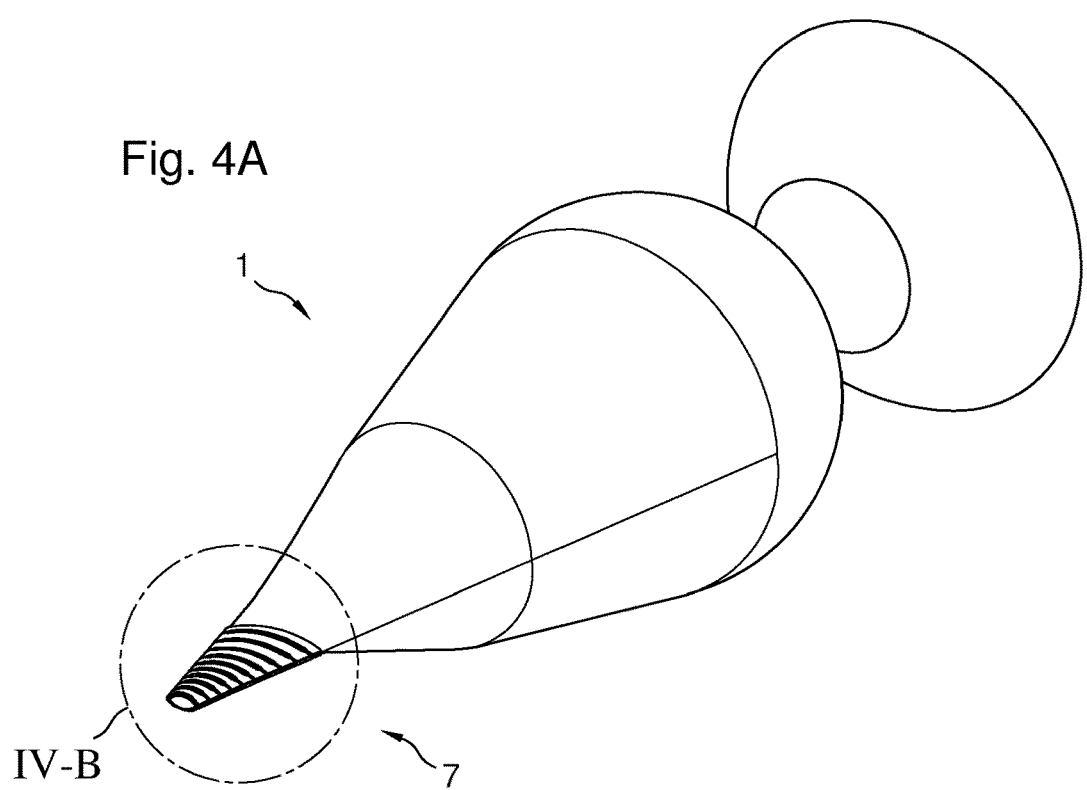
FIG. 4A shows, in a perspective view, the piping bag of FIG. 3A, however, wherein this time the dispensing opening structure is in an OPEN condition.

In FIGS. 3 and 4 it is seen that a user has created a relatively small dispensing orifice at the first prefabricated weakenings 31, by cutting off or snipping off a longitudinal section of the dispensing opening structure 7 at said first prefabricated weakenings 31.

In FIG. 5 it is seen that a user has created a relatively large dispensing orifice at the second prefabricated weakenings 35, by cutting off or snipping off a longitudinal section of the dispensing opening structure 7 at said second prefabricated weakenings 35.

As mentioned, in the shown example the first plate 11 and the second plate 12 are each fixedly attached to the outer side of the film material 20 of the circumferential boundary wall 2 of the piping bag 1. Alternatively, the first plate 11 and/or the second plate 12 may also be fixedly attached to the inner side of the film material 20 of the circumferential boundary wall 2 of the piping bag 1 or be fixedly embedded in-between different layers of a multi-layer film material 20.

In all FIGS. 1-5 it is seen that the first longitudinal side edge 21A of the first plate 11 is parallel to the second longitudinal side edge 22A of the second plate 12, while the other first longitudinal side edge 21B of the first plate 11 is parallel to the other second longitudinal side edge 22B of the second plate 12.

Figure 1B:
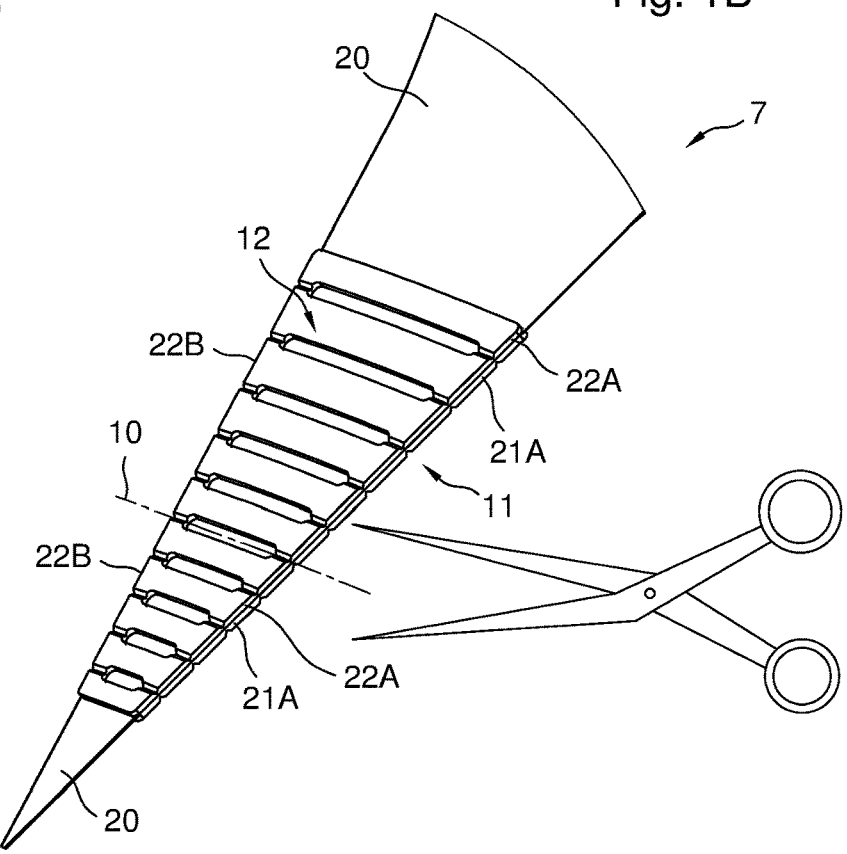
FIG. 1B shows an enlarged view of detail I-B, as indicated in FIG. 1A, said detail I-B showing the DISPENSING OPENING STRUCTURE of the piping bag of FIG. 1A.
Figure 2A:
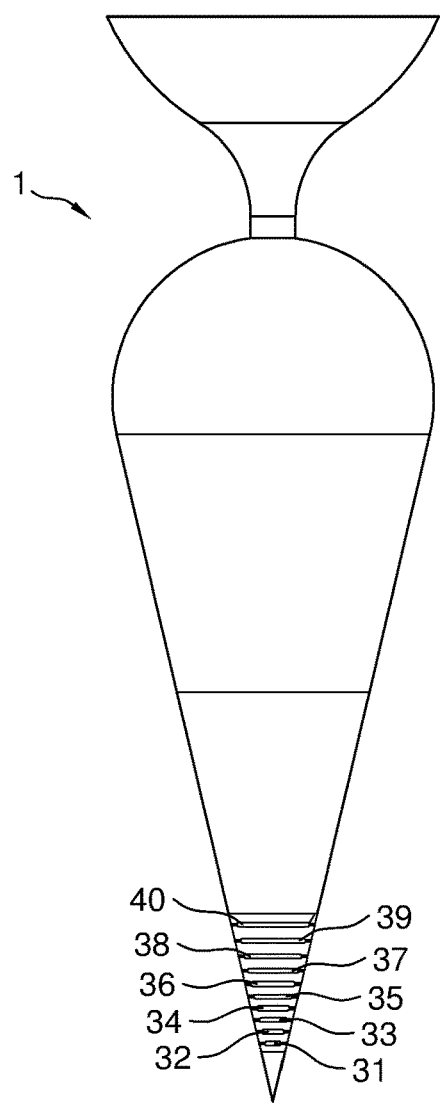
FIG. 2A shows the piping bag of FIG. 1A in a FIRST SIDE VIEW.
Figure 2B:
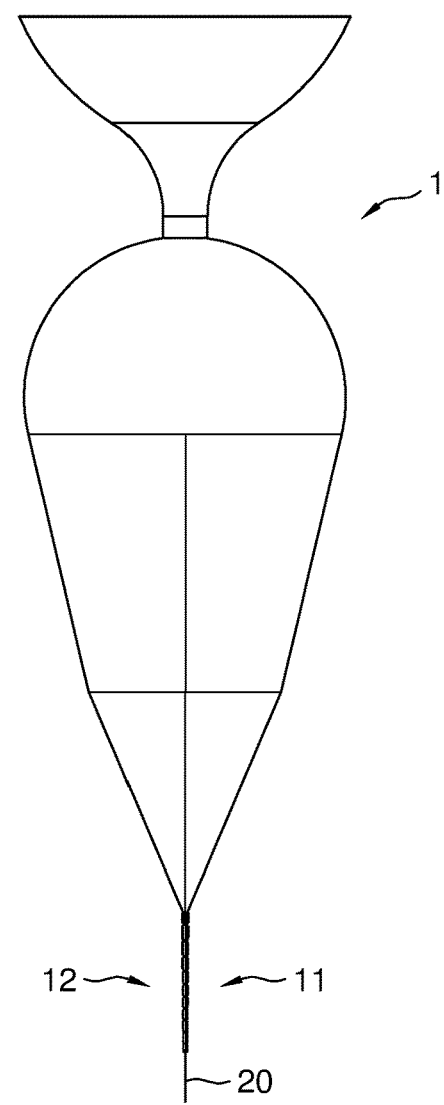
FIG. 2B shows the piping bag of FIG. 1A in a SECOND SIDE VIEW, which is perpendicular to the first side view of FIG. 2A.
Figure 2C:
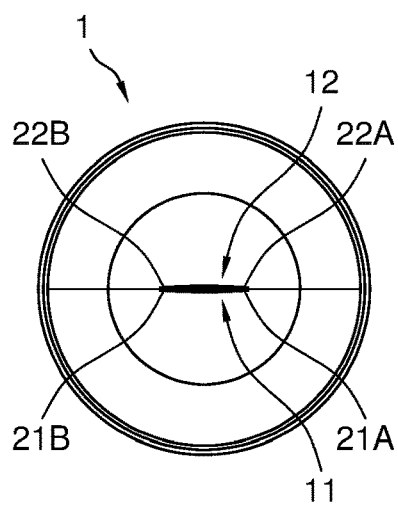
FIG. 2C shows the piping bag of FIG. 1A in a FRONT VIEW along the longitudinal direction of the piping bag.
Figure 4B:
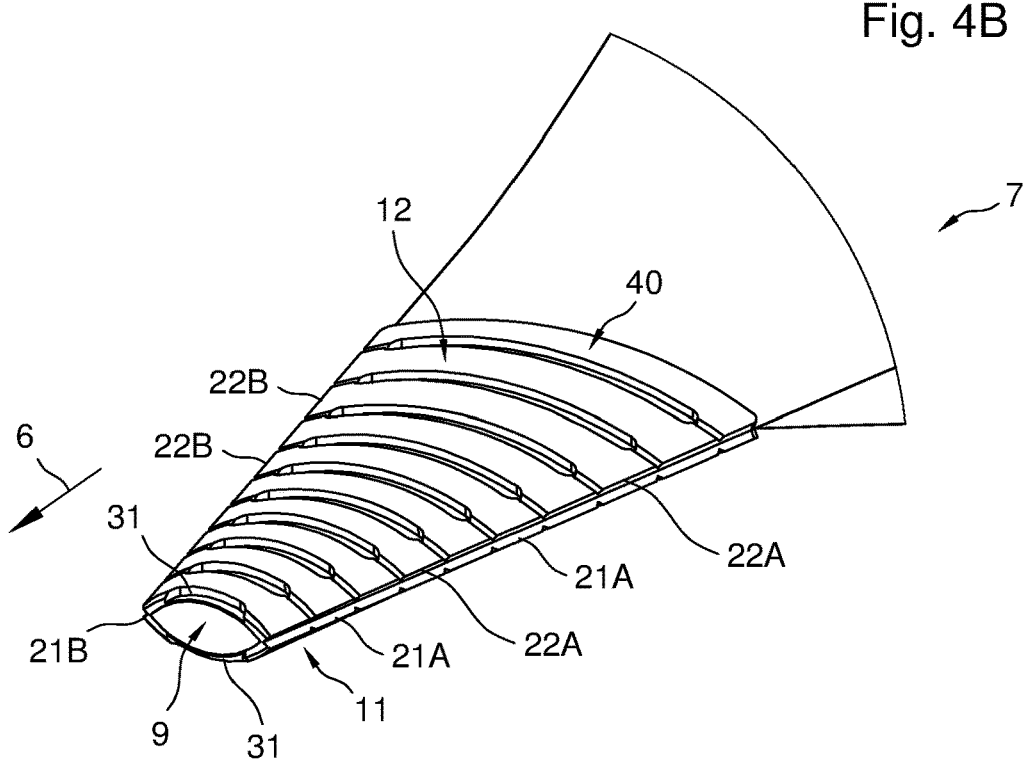
FIG. 4B shows an enlarged view of detail IV-B, as indicated in FIG. 4A.

It is further seen that in the closed condition of the dispensing opening structure 7 as shown in FIGS. 1B, 2C, 3B, as well as in the open conditions of the dispensing opening structure 7 as shown in FIGS. 4B, 5B, the first plate 11 and the second plate 12 are fixed relative to one another along the first and second side edges 21A and 22A, while in all said closed and open conditions the first plate 11 and the second plate 12 are additionally fixed relative to one another along the other first and second side edges 21B and 22B. In the shown example, these relative fixations between the first plate 11 and the second plate 12 along the first and longitudinal opposite side edges 21A, 22A, 21B, 22B are realized indirectly via the film material 20 to which the first and second plates 11 and 12 are fixedly attached.

The invention can be practiced with many various film materials of the flexible circumferential boundary wall of the piping bag, such as the many various materials that are used in known piping bags for dispensing a viscous mass of foodstuff.

The invention can further be practiced with many various materials of the first plate and the second plate. For example, the invention works very well when the first plate and the second plate are made of PET (polyethylene terephthalate) having a thickness of 0.5 mm, or, more generally, a thickness chosen within the range from 0.1 mm through 3.0 mm.

The overall length of the first plate and the second plate, as measured in the longitudinal direction, may for example be 40 mm, or, more generally be chosen within the range from 10 mm through 100 mm.

The overall width of the first plate and the second plate, as measured perpendicularly to the longitudinal direction, may for example be 30 mm, or, more generally be chosen within the range from 10 mm through 100 mm.

Also, many various shapes and angles of said narrowing of the first plate and the second plate in the dispensing direction are possible.

Furthermore, many various manners of fixing the first plate and the second plate relative to one another and/or relative to the film material are possible, such as sealing, gluing, welding, laminating, or using for example snap connections.

The invention claimed is:
1. A piping bag for dispensing a viscous mass of foodstuff, wherein:
   the piping bag comprises a flexible circumferential boundary wall of a film material,
   the circumferential boundary wall is extending circumferentially around a longitudinal direction of the piping bag,
   the piping bag comprises a filling end and a dispensing end, which are lying mutually opposite in said longitudinal direction,
   a dispensing direction of said piping bag is defined as extending along said longitudinal direction from said filling end towards said dispensing end,
   the piping bag along at least a part of the longitudinal direction is narrowing in said dispensing direction,
wherein
the circumferential boundary wall comprises a dispensing opening structure, which is elastically deformable, and which comprises a first plate and a second plate, wherein:
   each of the first plate and the second plate:
      is elastically deformable,
      is located at a dispensing end portion of the piping bag, wherein said dispensing end portion includes said dispensing end of the piping bag,
      is fixed relative to said film material of said flexible circumferential boundary wall,
   the first plate has a first pair of first longitudinal opposite side edges, which in said dispensing direction are mutually converging, whereby the first plate is narrowing in said dispensing direction, the second plate has a second pair of second longitudinal opposite side edges, which in said dispensing direction are mutually converging, whereby the second plate is narrowing in said dispensing direction, the respective first longitudinal opposite side edges of the first plate are parallel to the respective second longitudinal opposite side edges of the second plate, the first plate and the second plate are fixed relative to one another along the first longitudinal opposite side edges and the second longitudinal opposite side edges, wherein the respective first longitudinal opposite side edges of the first plate are fixed relative to the respective second longitudinal opposite side edges of the second plate, in such manner that the dispensing opening structure has:

a closed condition in which the first plate and the second plate are each in an elastically relaxed condition in which the first plate and the second plate are straightly planar and are extending alongside one another in a mutually parallel manner, whereby the first plate and the second plate are creating a closure of said dispensing end portion of the piping bag, wherein said closure prevents a viscous mass of foodstuff inside the piping bag to be dispensed from the piping bag in that said viscous mass of foodstuff can not pass between the first plate and the second plate, and an open condition in which, under influence of a user pressurizing said viscous mass of foodstuff within the piping bag, the first plate and the second plate are each in an elastically tensioned condition by being elastically deformed, relative to said elastically relaxed condition, in a circumferentially curved manner around the longitudinal direction of the piping bag, whereby in-between the first plate and the second plate a dispensing passage is automatically created for expelling said viscous mass of foodstuff, via said dispensing passage, from the piping bag.

2. The piping bag according to claim 1, wherein at least the film material of the flexible circumferential boundary wall closes off the dispensing end of the piping bag to prevent said viscous mass of foodstuff inside the piping bag to be dispensed from the piping bag, even in case of said open condition of the dispensing opening structure, and wherein said user can cut or snip through the film material, the first plate and the second plate in a cutting or snipping direction transverse to the longitudinal direction of the piping bag to cut off or snip off a part of the dispensing end portion of the piping bag, so as to undo that at least the film material of the flexible circumferential boundary wall closes off the dispensing end of the bag, and so as to allow said viscous mass of foodstuff inside the piping bag to be dispensed from the piping bag in said open condition of the dispensing opening structure.

3. The piping bag according to claim 1, wherein the first plate and/or the second plate are comprising at least one prefabricated weakening, which is extending in a cutting or snipping direction transverse to the longitudinal direction of the piping bag to facilitate removal at said prefabricated weakening a longitudinal section, in said longitudinal direction, of the dispensing opening structure.

4. The piping bag according to claim 3, wherein said at least one prefabricated weakening comprises a first prefabricated weakening and a second prefabricated weakening, wherein the first prefabricated weakening is located farther in said dispensing direction than the second prefabricated weakening.

\* \* \* \* \*